(12) United States Patent (10) Patent No.: US 8,766,792 B1
Mccandless (45) Date of Patent: Jul. 1, 2014

(54) MAGNETIC TRACKING COLLAR DEACTIVATOR

(76) Inventor: Melvin Mccandless, Williamston, NC (US)

(*) Notice: Subject to any disclaimer, the term of this patent is extended or adjusted under 35 U.S.C. 154(b) by 879 days.

(21) Appl. No.: 12/959,570

(22) Filed: Dec. 3, 2010

Related U.S. Application Data

(60) Provisional application No. 61/304,590, filed on Feb. 15, 2010.

(51) Int. Cl.
*G08B 1/08* (2006.01)
(52) U.S. Cl.
USPC .................................. 340/539.13; 340/573.3
(58) Field of Classification Search
USPC ...................... 340/539.13, 35, 7.71, 357.5, 5; 455/426.1
See application file for complete search history.

(56) References Cited

U.S. PATENT DOCUMENTS 5,900,818 A * 5/1999 Lemnell ..................... 340/573.3

* cited by examiner

*Primary Examiner* — Shirley Lu
(74) *Attorney, Agent, or Firm* — Gulf Coast Intellectual Property Group

(57) ABSTRACT

A storage device operable to store a plurality of radio signal emitting tracking collars wherein subsequent the tracking collars being engaged with the storage device the storage device operably engages the magnetic switch of the tracking collars to suspend the radio signal emission from the collar. The storage device further includes a mounting member that is substantially hollow being mounted on a base plate in a generally vertical position. Disposed within the mounting member is a bar magnet that has a vector field having a direction and magnitude that extends to at least the perimeter of the base plate so as to operable engage the magnetic switch of the tracking collar placed on the storage device. The storage device further includes two support rods mounted in a generally vertical manner operable to assist in the maintenance of the correct position of the tracking collars once the tracking collars have been placed on the storage device.

13 Claims, 4 Drawing Sheets

_US 8,766,792 B1_

MAGNETIC TRACKING COLLAR DEACTIVATOR

CROSS REFERENCE TO RELATED APPLICATION

This nonprovisional application claims priority based upon the following prior U.S. Provisional Patent Application entitled: MAGNETIC TRACKING COLLAR DEACTIVATOR, Application No. 61/304,590, filed Feb. 15, 2010, in the name of Melvin McCandless, which is hereby incorporated by reference for all purposes.

FIELD OF THE INVENTION

The present invention relates to a tracking collar storage and deactivation device, more specifically a hunting dog tracking collar deactivation device that is configured to receive and store a plurality of tracking collars wherein during storage on the device the tracking functionality of the collar is deactivated.

BACKGROUND

Millions of individuals engage in the sport of hunting. While there are many different types of hunting techniques, one popular technique is to utilize at least one or more trained dogs to assist in the location and/or successful retrieval of the intended prey. For example but not by way of limitation, hunter's will often utilize at least one dog to track an intended target. During tracking of the intended target, the dog typically becomes separated from the hunter and the separation can be a significant distance wherein the hunter can no longer physically see the dog. Under these circumstances the hunter typically utilizes a tracking collar that is releasably secured to the dog to assist in the location of the dog during the hunt.

As is known in the art, tracking collars are releasably secured to a dog that emit a signal, typically a radio signal, that can be received by a hand held receiver utilized by the hunter. The receiver detects the strength of the signal and is usually configured to display to the hunter the general direction of the source of the signal and calculate the distance based on the strength of the signal. Most tracking collars utilize a switch such as but not limited to a reed switch to activate the signal production of the transmitter. Currently, most existing tracking collar transmitters are configured to utilize a separate magnet key to deactivate the switch in order to discontinue signal production from the transmitter. One problem with utilizing a separate magnet key is that the magnet key is often very small and can be easily lost. Another issue with current magnet keys utilized to deactivate the output signal of the transmitter is that they must be affixed to a precise location on the collar in order to function correctly. This usually requires the use of o-rings or similar devices that are often cumbersome to use.

Additionally, current magnet keys for tracking collars can easily become dislodged from their correct location on the transmitter when not in use which results the loss of power of the battery. Most conventional tracking collars require their own magnet key for deactivation which can create a key management issue for hunters that utilize several dogs each having their own tracking collar.

Accordingly, there is a need for a magnetic tracking collar deactivation device that can accommodate a plurality of tracking collars thereon and eliminate the need for a magnet key for each tracking collar.

SUMMARY OF THE INVENTION

It is the object of the present invention to provide a device that is capable of storing more than one tracking collar wherein the device further includes a magnetic field so as to deactivate the radio transmission of the tracking collar during storage on the device.

Another object of the present invention is to provide a device that is capable of storing a plurality of tracking collars that includes a body having a magnetic source disposed therein capable of deactivating the switches disposed within the tracking collars.

A further object of the present invention is to provide a device that can store a plurality of tracking collars and simultaneously deactivate the radio signal production thereof that can accommodate collars having transmitters of varying sizes.

Still another object of the present invention is to provide a device that can store a plurality of tracking collars and deactivate the radio signal production thereof that includes a base plate to support the body having a magnetic source.

An additional object of the present invention is to provide a device that can store a plurality of tracking collars and deactivate the radio signal production thereof that includes at least two support members adjacent to the body to assist in the correct placement of the tracking collars on the device.

Yet another object of the present invention is to provide a device that can store a plurality of tracking collars and deactivate the radio signal production thereof so as to eliminate the need for a magnet key for each tracking collar.

A further object of the present invention is to provide a device that can store a plurality of tracking collars and deactivate the radio signal production thereof that produces a magnetic field sufficient in strength so as to eliminate the need to check proper deactivation with a receiver.

Another object of the present invention is to provide a device that can store a plurality of tracking collars and deactivate the radio signal production thereof that produces a magnetic field sufficient in strength so as to maintain the tracking collar in a deactivated state in order to preserve the battery lifespan of the tracking collar.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
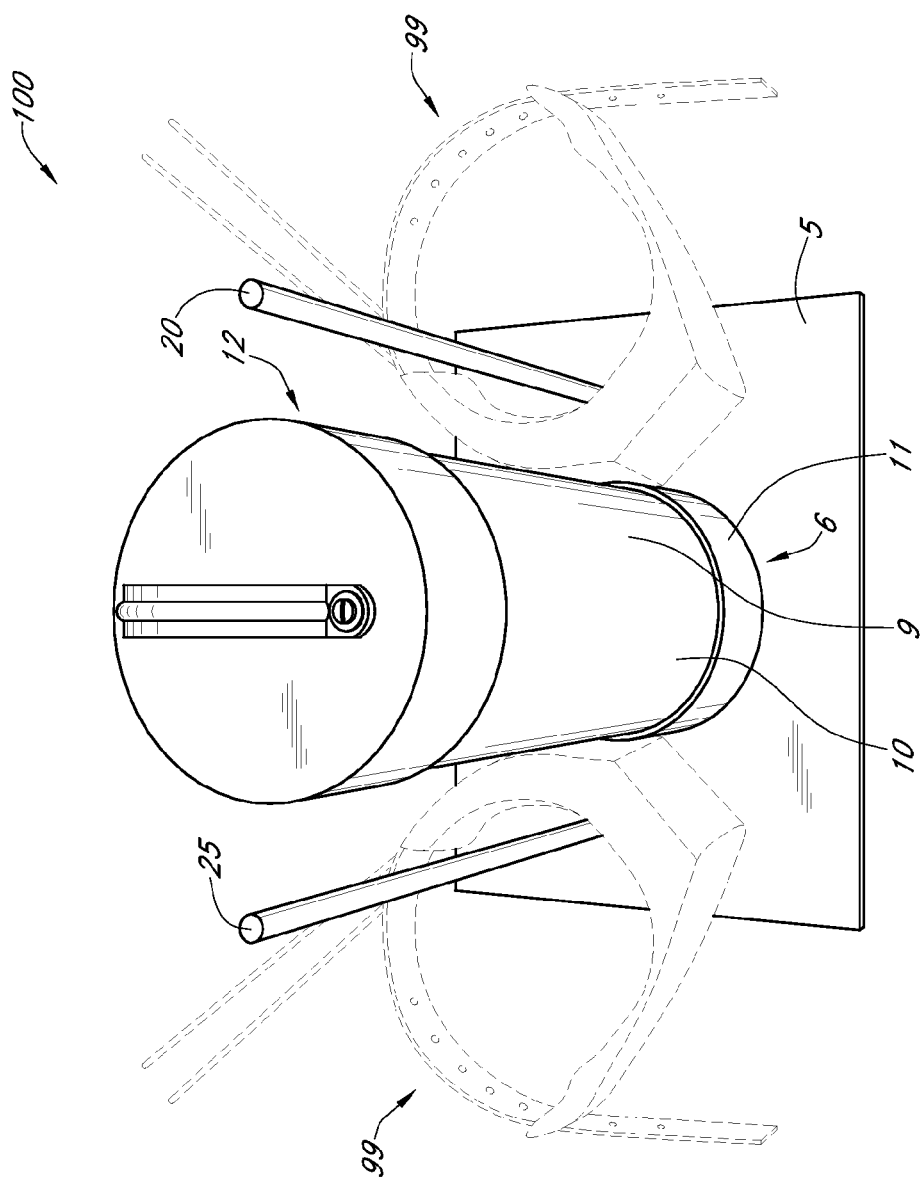
FIG. 1 is a perspective view of an embodiment of the invention showing two conventional tracking collars engaged therewith.
Figure 2:
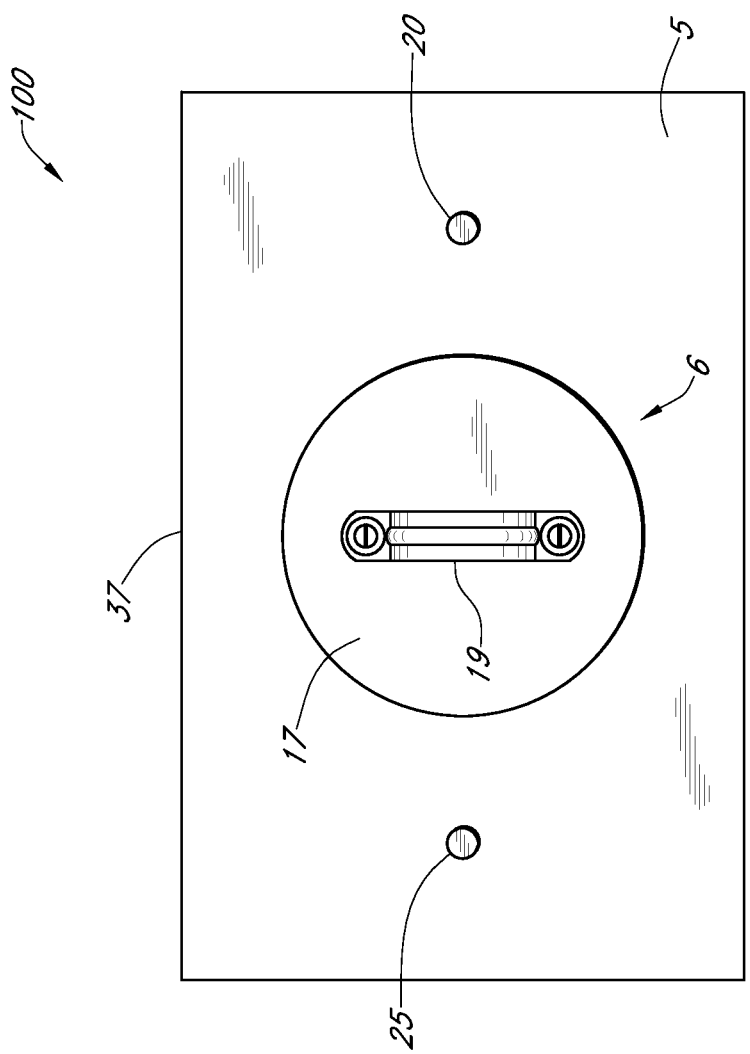
FIG. 2 is a top view of the present invention.
Figure 3:
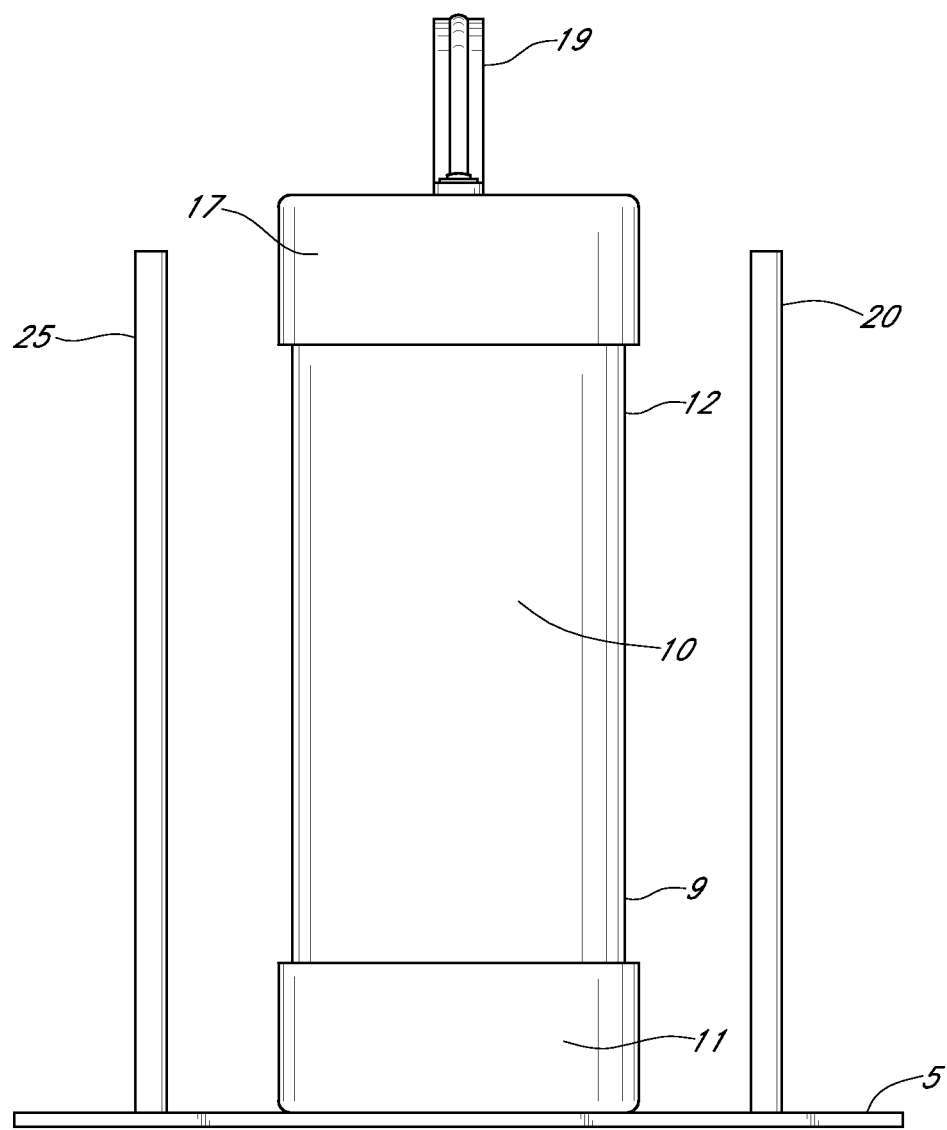
FIG. 3 is a side view of the present invention.

Referring now to the drawings submitted herewith, wherein various elements depicted therein are not necessarily drawn to scale and wherein through the views and figures like elements are referenced with identical reference numerals, there is illustrated a collar storage and deactivation device 100 constructed according to the principles of the present invention.

Figure 4:
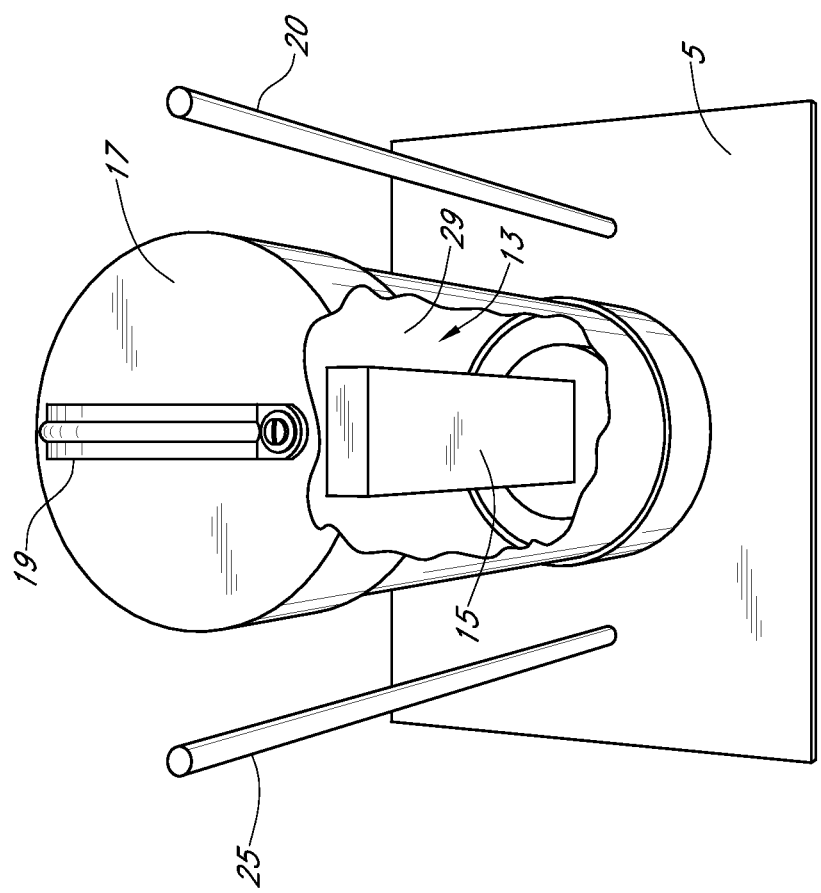
FIG. 4 is a perspective view of the present invention showing the internal magnet source disposed therein.

Referring in particular to FIGS. 1 and 4, the collar storage and deactivation device 100 further includes a base plate 5 operable to maintain the collar storage and deactivation device 100 in a generally vertical position upon the collar storage and deactivation device 100 being supposed a generally horizontal support structure. A body 10 is further included having a magnetic source 15 disposed therein. Additionally, a first support rod 20 and second support rod 25 are secured to the base plate 5 in a generally vertical manner and are located on opposing sides of the body 10.

The base plate 5 further includes an outer edge 37 and is manufactured from a suitable durable material such as but not limited to plastic or metal. The base plate 5 functions to maintain the collar storage and deactivation device 100 in a generally vertical position subsequent the collar storage and deactivation device 100 being superposed a suitable generally horizontal support structure. While no particular size of the base plate 5 is required, good results have been achieved utilizing a base plate 5 that is approximately nine inches in length by nine inches in width. Additionally, while the base plate 5 in the preferred embodiment herein is illustrated as being square in shape, it is contemplated within the scope of the present invention that the base plate 5 could be manufactured in numerous different shapes and still perform the desired function as described herein.

A body 10 is superposed the base plate 5 generally in the middle section 6. The body 10 is cylindrical in shape having a first end 11 and a second end 12. The body 10 is generally hollow having an internal volume 13 and is integrally secured to the base plate 5 proximate the first end 11 utilizing suitable mechanical or chemical methods. The body 10 is positioned proximate the middle section 6 so as to frictionally engage and substantially maintain the position of the exemplary tracking collars 99 in conjunction with either the first support rod 20 or second support rod 25 such that the exemplary tracking collars 99 are biased against the side 9 of the body 10. It is contemplated within the scope of the present invention that the body 10 could be mounted in numerous positions on the base plate 5 relative to either the first support rod 20 or second support rod 25 so as to accommodate at least one exemplary tracking collar 99 therebetween wherein the body 10 and either the first support rod 20 or second support rod 25 are positioned so as to substantially maintain the exemplary tracking collar 99 in a biased and stable position.

The body 10 further includes a top 17 having a handle 19 that is releasably secured to the body 10 proximate the second end 12. The top 17 is releasably secured to the body 10 utilizing suitable durable methods such as but not limited to mateable threads or frictional engagement. The handle 19 is manufactured from a suitable durable material such as but not limited to metal and is generally arcuate in shape. While the body 10 is illustrated herein as being cylindrical in shape, it is further contemplated within the scope of the present invention that the body 10 could be formed in numerous different shapes and still achieve the desired functionality as described herein.

The first support rod 20 and second support rod 25 are positioned adjacent to the body 10 at a distance such that the exemplary tracking collars 99 will be maintained in a biased position against the side 9 of the body 10. The first support rod 20 and second support rod 25 are secured to the base plate 5 utilizing suitable durable mechanical or chemical methods. The first support rod 20 and second support rod 25 are manufactured from a suitable durable rigid material such as but not limited to metal or plastic. The first support rod 20 and second support rod 25 are generally positioned on opposing sides of the body 10. While the first support rod 20 and second support rod 25 are illustrated herein as being positioned on opposing sides of the body 10, it is contemplated within the scope of the present invention that the first support rod 20 and second support rod 25 could be position in numerous places on the base plate 5 relative to the body 10 in order to assist in maintaining an exemplary tracking collar 99 in a relatively fixed position therebetween. Additionally, while there is illustrated in the preferred embodiment herein a first support rod 20 and a second support rod 25, it is contemplated within the scope of the present invention that the collar storage and deactivation device 100 that any number of support rods could be utilized. Furthermore, while the first support rod 20 and second support rod 25 are disclosed herein as being generally cylindrical in shape, it is contemplated within the scope of the present invention that the first support rod 20 and second support rod 25 could be formed in numerous different shapes.

As shown in particular in FIG. 4, the internal volume 13 of the body 10 has a sufficient capacity to have disposed therein the magnetic source 15. As is known in the art, exemplary tracking collars 99 typically emit a radio signal when activated. Conventional tracking collars utilize a magnetic switch to deactivate the radio emission in order to preserve the battery life by inhibiting the emission of the radio signal when not in use. The magnetic source 15 disposed within the internal volume 13 of the body 10 functions to deactivate radio transmission of the exemplary tracking collars 99 subsequent the exemplary tracking collars 99 being placed adjacent to the body 10. The magnetic source 15 is a conventional magnet that is mounted utilizing suitable and durable methods in the interior volume 13 of the body 10. As is known in the art, a magnet is a material or object that produces a magnetic field, which is a vector field that has a direction and a magnitude (also called strength). An exemplary magnet has a South pole and a North pole and magnetic field vectors that represent the direction and magnitude of the magnet's moment. The magnet's moment is a vector that characterizes the overall magnetic properties of the magnet. For a conventional bar magnet, the direction of the magnetic moment points from the South pole to the North pole. The North and South poles are also referred to as positive (+) and negative (−) poles, respectively. The magnetic source 15 is a conventional bar magnet having a vector field with a sufficient magnitude and direction so as to operably engage the magnetic switch (not illustrated herein) of the exemplary tracking collars 99. The magnetic source 15 emits a vector field that extends to at least the outer edge 37 so as to effectively engage the magnetic switch of the exemplary track collars 99. Subsequent the exemplary tracking collar 99 being placed in a biased position intermediate either the first support rod 20 or the second support rod 25 and the body 10, the magnetic source 15 operably engages the magnetic switch disposed within the exemplary tracking collar 99 and deactivates the radio emission therefrom. While the magnetic source 15 is illustrated herein as being a conventional magnetic bar centrally disposed within the interior volume 13 of the body 10, it is contemplated that the magnetic source 15 could be formed and/or positioned in numerous different manners and still achieve the functionality as described herein. More specifically but not by way of limitation, the magnetic source 15 could be positioned along the internal wall 29 of the body 10 either partially or substantially around the circumference thereof and produce a magnetic vector field having a direction and magnitude capable of operably engaging with a magnetic switch of an exemplary tracking collar 99 placed adjacent thereto.

Referring in particular to FIGS. 1 and 4, a description of the operation of the collar storage and deactivation device is as follows. In use, the user will place the collar storage and deactivation device 100 on a suitable support structure such as the ground. At least one exemplary tracking collar 99 is placed such that the exemplary tracking collar 99 is intermediate the body 10 and either the first support rod 20 or the second support rod 25. Subsequent the exemplary tracking collar 99 being placed on the collar storage and deactivation device 100, the vector field of the magnetic source 15 has sufficient direction and magnitude to operably engage with the conventional magnetic switch of the exemplary tracking collar 99 and engage the switch so as to suspend radio emission from the exemplary tracking collar 99. The user can place a plurality of exemplary tracking collars 99 on the collar storage and deactivation device 100 in order to suspend radio emission from each exemplary tracking collar 99. The magnetic source 15 has a vector field having a sufficient direction and magnitude so as to operably engage a plurality of exemplary tracking collars 99. Upon requiring use of at least one of the exemplary tracking collars 99, the user will remove the exemplary tracking collar from the collar storage and deactivation device 100 wherein upon removal from the vector field of the magnetic source 15, the exemplary tracking collar 99 begins radio emissions.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A storage device operable to store and deactivate at least one radio emitting tracking collar having a magnetic switch comprising:
a base, said base being substantially square in shape and planar in manner, said base being constructed of a substantially rigid material, said base being generally horizontal in configuration, said base having an outer edge;
a mounting member, said mounting member being substantially hollow having at least one wall, a bottom and a top defining an interior volume, said mounting member being integrally secured to said base proximate said bottom, said mounting member being generally vertical in orientation;
a first support rod, said first support rod being mounted to said base, said first support rod being positioned on said base adjacent to said mounting member, said first support rod positioned so as to receive a portion of a tracking collar, said first support rod operable to assist in maintaining the tracking collar in a substantially fixed position biased against said mounting member;
a magnetic source, said magnetic source being disposed within the interior volume of said mounting member, said magnetic source operable to suspend the radio emissions of at least one tracking collar placed adjacent to said mounting member.

2. The storage device as recited in claim 1, wherein said magnetic source has a vector field that extends outward to said outer edge of said base.

3. The storage device as recited in claim 2, wherein the vector field of said magnetic source has a direction and magnitude so as to operably engage the magnetic switch of at least one tracking collar subsequent said tracking collar having at least a portion placed intermediate said mounting member and said first support rod so as to deactivate the radio emissions.

4. The storage device as recited in claim 3, wherein said first support rod is configured in a generally vertical manner and substantially parallel with said mounting member.

5. The storage device as recited in claim 4, and further including a second support rod, said second support rod being mounted to said base, said second support rod configured in a generally vertical manner, said second support rod located on said base opposite said first support rod.

6. The storage device as recited in claim 5, wherein said top is removable so as to provide access to said magnetic source.

7. The storage device as recited in claim 6, wherein said magnetic source is a bar magnet.

8. A radio collar storage device operable to store and deactivate a plurality of radio emitting tracking collars having a magnetic switch comprising:
a base plate, said base being substantially square in shape and planar in manner, said base plate being substantially rigid, said base plate being generally horizontal in configuration, said base plate having an outer edge;
a mounting member, said mounting member being substantially hollow, said mounting member being cylindrical in shape, said mounting member having a bottom and a top defining an interior volume, said mounting member being integrally secured to said base plate proximate said bottom, said mounting member being generally vertical in orientation;
a first support rod, said first support rod being mounted to said base plate, said first support rod being positioned on said base plate adjacent to said mounting member, said first support rod positioned so as to receive at least a portion of a plurality of tracking collars, said first support rod operable to assist in maintaining a plurality of tracking collars in a substantially fixed position biased against said mounting member;
a magnetic source, said magnetic source having a vector field, said magnetic source being disposed within the interior volume of said mounting member, said magnetic source operable to suspend the radio emissions of the plurality of tracking collars adjacent to said mounting member.

9. The radio collar storage device as recited in claim 8, wherein the vector field of said magnetic source has a direction and magnitude so as to operably engage the magnetic switch of the plurality of tracking collars subsequent said plurality of tracking collars having at least a portion thereof placed intermediate said mounting member and said first support rod, the vector field operable to place the magnetic switch of the plurality of tracking collars in a position such that the plurality of tracking collars suspend radio emissions.

10. The radio collar storage device as recited in claim 9, wherein said magnetic source has a vector field that extends outward to at least proximate said outer edge of said base plate.

11. The radio collar storage device as recited in claim 10, wherein said top is removable so as to provide access to said magnetic source.

12. The radio collar storage device as recited in claim 11, and further including a second support rod, said second support rod being mounted to said base plate, said second support rod configured in a generally vertical manner, said second support rod located on said base plate opposite said first support rod.

13. The radio collar storage device as recited in claim 12, wherein said magnetic source is a bar magnet.

\* \* \* \* \*